United States Patent [19]

Freemyer

[11] 3,868,043
[45] Feb. 25, 1975

[54] NO-SPILL HOT CUP LID
[76] Inventor: Howard R. Freemyer, P.O. Box 21, Jayton, Tex. 79528
[22] Filed: Sept. 14, 1973
[21] Appl. No.: 397,266

[52] U.S. Cl. .............................................. 220/90.4
[51] Int. Cl. ............................................. A47g 19/22
[58] Field of Search .......... 220/90.4, 90.6, 27, 90.2, 229/43, 7; 206/508, 515, 519

[56] References Cited
UNITED STATES PATENTS

| | | | |
|---|---|---|---|
| 2,661,889 | 12/1953 | Phinney | 220/90.4 X |
| 2,765,639 | 10/1956 | Bryant | 220/90.4 |
| 3,777,968 | 12/1973 | Law | 220/43 X |
| 3,800,999 | 4/1974 | Serritella | 220/90.4 X |

Primary Examiner—William I. Price
Assistant Examiner—Steven M. Pollard
Attorney, Agent, or Firm—Wendell Coffee

[57] ABSTRACT

A lid adapted to be snaped over a disposable cup filled with coffee has a perforated drinking section along one edge. The top of the lid slopes toward the drinking section so that any liquid spilled or poured on the lid flows back into the cup. Optional radial ridges on the top make it possible to stack one upon the other.

10 Claims, 6 Drawing Figures

PATENTED FEB 25 1975 3,868,043

PATENTED FEB25 1975
3,868,043
SHEET 2 OF 2
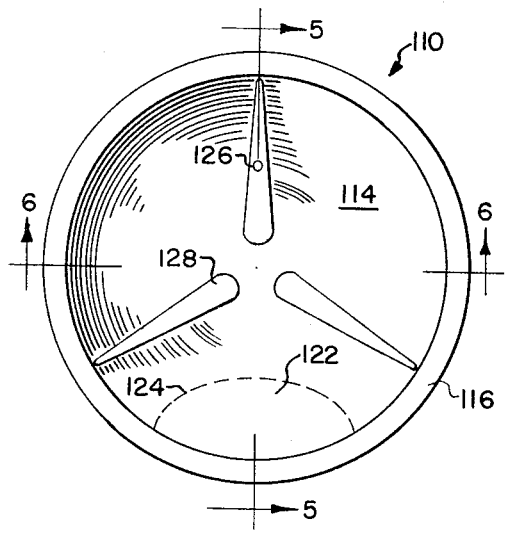
Fig. 4
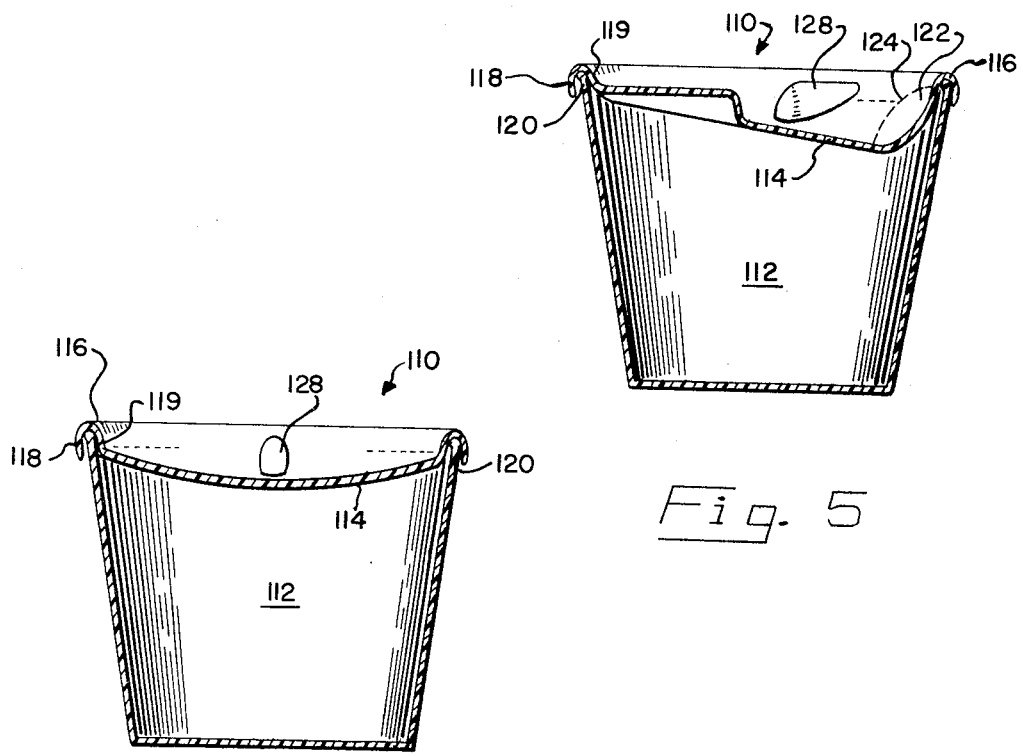
Fig. 5
Fig. 6

NO-SPILL HOT CUP LID

BACKGROUND OF THE INVENTION

1. Field of the Invention

This invention relates to disposable drinking containers and more particularly to a cover for a disposable hot drink cup adapted to be used by a person in a moving vehicle.

2. Description of the Prior Art

In the mobile society, such as exists today, a great number of disposable containers are used for drinking coffee and other liquids in moving vehicles. Examples include passengers upon aircraft and also motorists.

A problem generally exists in that if the container is open it tends to slosh out the contents, such as coffee, making it undesirable.

In drinking other liquids, such as milk drinks or iced drinks, it is common to place a lid over the container and to have a punch-hole in the lid so a straw may be inserted therethrough. This is not desirable for coffee for several reasons.

First, most people prefer not to drink hot liquid through a straw.

Second, people often desire to add other ingredients to the coffee, such as cream and sugar, and to stir them.

Although it is unrelated to my invention, previous workers in the art with baby cups have suggested placing lids over infants drinking cups which have somewhat similar shape as mine, however, they are in general distinguishable.

The following U.S. Pat. Nos. were reported upon a search made upon this invention before filing:

| | |
|---|---|
| Harbeck | 765,888 |
| Taylor | 1,773,553 |
| Taylor | 2,008,088 |
| Vinegron | 2,689,664 |
| Bennett | 2,956,721 |
| Cochrane | 3,048,317 |
| Davis | 3,171,580 |
| Gardner | 3,301,459 |

SUMMARY OF THE INVENTION

1. New and Different Function

I have solved all of the problems of the prior art by providing a lid which has a small opening at the edge so a person can drink from the cup in the normal fashion. Also, I provide the lid to slope toward the opening; therefore, if any of the contents of the cup does spill out on the lid, it runs back into the cup. This also provides a convenience for adding cream or sugar without removing the lid. Particularly, cream can be merely poured onto the top of the lid and it runs by gravity to the drinking section and on into the cup. The opening though small is sufficiently large to use a stir stick or spoon to stir the coffee if cream or sugar is added.

2. Objects of this Invention

An object of this invention is to provide a lid for a cup of liquid.

Other objects are to achieve the above with a device that is sturdy, compact, durable, lightweight, simple, safe, efficient, versatile, and reliable, yet inexpensive and easy to manufacture, install and use.

The specific nature of the invention, as well as other objects, uses, and advantages thereof, will clearly appear from the following description and from the accompanying drawing, the different views of which are not necessarily to the same scale.

BRIEF DESCRIPTION OF THE DRAWING

FIG. 4 is a top plan view of a second embodiment with stacking ridges.

FIG. 5 is a sectional view thereof taken substantially on line 5—5 of FIG. 4.

FIG. 6 is a sectional view taken substantially on line 6—6 of FIG. 4.

DESCRIPTION OF THE PREFERRED EMBODIMENTS

Figure 1:
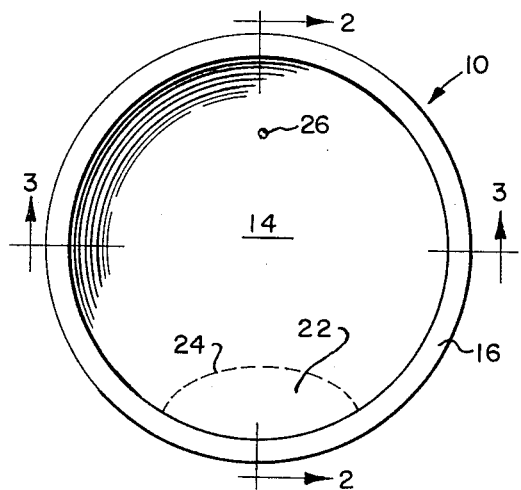
FIG. 1 is a top plan view of a first embodiment of this invention.
Figure 2:
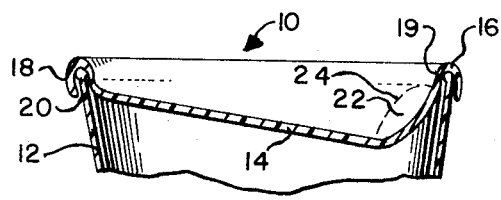
FIG. 2 is a sectional view thereof taken substantially on line 2—2 of FIG. 1.
Figure 3:
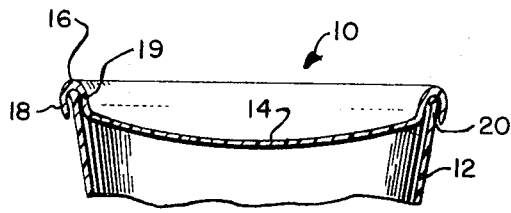
FIG. 3 is a sectional view thereof taken substantially on line 3—3 of FIG. 1.

Referring to FIGS. 1, 2, and 3, there may be seen an embodiment of lid 10 as adapted to be placed upon container or cup 12. The cup 12 and the lid 10 are shown to be of the same thickness. Although this might be true, also it might be true that the lid 10 is of considerably thinner plastic material. The cup 12 might be constructed of styrofoam or other material with much thicker cross section. Also, it is represented to be plastic or synthetic material because this is considered to be the most advantageous material. However, the materials could be either paper, or other convenient inexpensive material.

The lid 10 includes panel 14 which generally covers the top of the cup 12. The panel 14 is surrounded by rim 16. The rim in cross section (FIGS. 2 and 3) has edges with an upward extending bight. This bight is formed as between outer flange 18 on the outside and inner flange 19 across the bight of the rim 16. The outer flange 18 is a circular circumferential flange and is adapted to fit snugly over rim 20 of the cup 12.

Drinking section 22 is located adjacent one portion of the edge of the lid 10. The drinking section extends circumferentially around the lid for only a short portion thereof. As depicted in the drawing, it extends approximately 60°, which is to say approximately 1/6th of the circumference of the cup. However, according to design, it might be made greater or less; in any event, the drinking section 22 would be less than ⅓rd of the circumference of the lid 10. Also, the drinking section 22 extends across the panel 14 about 1/5th across the way of the cup, but in any event, the drinking section extends less than ⅓rd of the way diametrically across the panel 14.

The drinking section 22 is defined by perforations 24 or the scoring along its boundaries so it is easily torn out for use. It is contemplated that it be raised slightly on the inside portion, i.e., the part toward the center of the cup 12 so that the fingernail of the user or the edge of a spoon or knife could be slipped under to lift it out so sugar and cream could be added, a spoon inserted through the drinking section and, ultimately the coffee sipped or drank through the drinking section 22. The drinking section terminates about the middle of the inside flange 19.

Referring specifically to the drawings, there may be seen that the panel 14 slopes from the rim to the drinking section 22. This may be seen particularly in FIG. 2 where the panel slopes all the way from the opposite rim to the drinking section 22. The sloping also may be seen in FIG. 3, although at the section shown there, the lid 10 slopes toward the center, if it slopes toward the center, it likewise slopes toward the drinking section 22.

Vent 26 is provided in the panel opposite the drinking section 22 to permit air to enter the cup 12 when the coffee is being drunk therefrom as the lips of the drinker completely encircle the drinking section.

Referring to FIG. 5, there is seen the same basic arrangement. I.e., there is lid 110 on cup 112 and has central panel 114. The edge also has the bight shaped rim 116 defined as between outside flange 118 and inside flange 119. This bight fits over the rim of the cup 120. There is also drinking section 122. However, in addition, the embodiment shown in FIGS. 4, 5, and 6, has three stacking ridges 128. These ridges extend from an area near the center of the panel 114 and extend radially outward. The ridges 128 are equally spaced around the lid 110, i.e., equally spaced circumferentially. Also, the drinking section 122 is equally spaced between two of the stacking ridges 128. I call them stacking ridges because with their inclusion, the cups 112 with lids 110 attached may be stacked one on top of the other with the base of the cup resting upon the ridges 128. If these ridges were not included and an attempt were made to stack one cup on top of the other, the upper cup would sit at an angle inasmuch as the panel is sloped toward the drinking section 122. The slope is still maintained in the embodiment with the stacking ridges. Also, the tops of the stacking ridges 128 are level. Vent 126 is provided in the stacking ridge 128 opposite the drinking section 122.

The embodiments shown and described above are only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific examples above do not point out what an infringement of this patent would be, but are to enable the reader to make and use the invention.

I claim as my invention:

1. A no-spill cup lid adapted to fit over a cup filled with hot liquid such as coffee comprising:
   a. a circular circumferential flange adapted to snugly fit over the rim of the cup,
   b. a cover panel extending within the confines of the flange to cover the cup,
   c. a drinking section of the lid at an edge of the panel,
   d. the section perforated along its boundary,
   e. said perforated boundary extending over less than one-third the circumference of the lid at the edge of the lid,
   f. said section extending across the lid less than one third the diameter of the lid, and
   g. the panel sloped downward from the edge to the drinking section.

2. The invention as defined in claim 1 with an additional limitation of
   h. a vent hole in the panel opposite the drinking section.

3. The invention as defined in claim 1 with an additional limitation of
   h. at least three stacking ridges extending radially and upward on the cover panel.

4. The invention as defined in claim 3 with an additional limitation of
   j. the drinking section between two stacking ridges.

5. The invention as defined in claim 4 with an additional limitation of
   k. a vent hole in the panel opposite the drinking section.

6. The invention as defined in claim 1 with an additional limitation of
   h. the cross section of the lid forming a bight at the edge to fit over the rim of the cup with the circumferential flange on the outside so as to form a rim around the cover panel.

7. The invention as defined in claim 6 with an additional limitation of
   j. a vent hole in the panel opposite the drinking section.

8. The invention as defined in claim 6 with an additional limitation of
   j. at least three stacking ridges extending radially and upward on the cover panel.

9. The invention as defined in claim 8 with an additional limitation of
   k. the drinking section between two stacking ridges.

10. The invention as defined in claim 9 with an additional limitation of
    m. a vent hole in the panel opposite the drinking section.

* * * * *